April 15, 1958
E. GOLDBOHM ET AL
2,831,185
SYSTEM FOR IDENTIFYING AND PILOTING MOBILE
OBJECTS FROM A CONTROL OFFICE
BY MEANS OF RADAR
Filed June 11, 1953
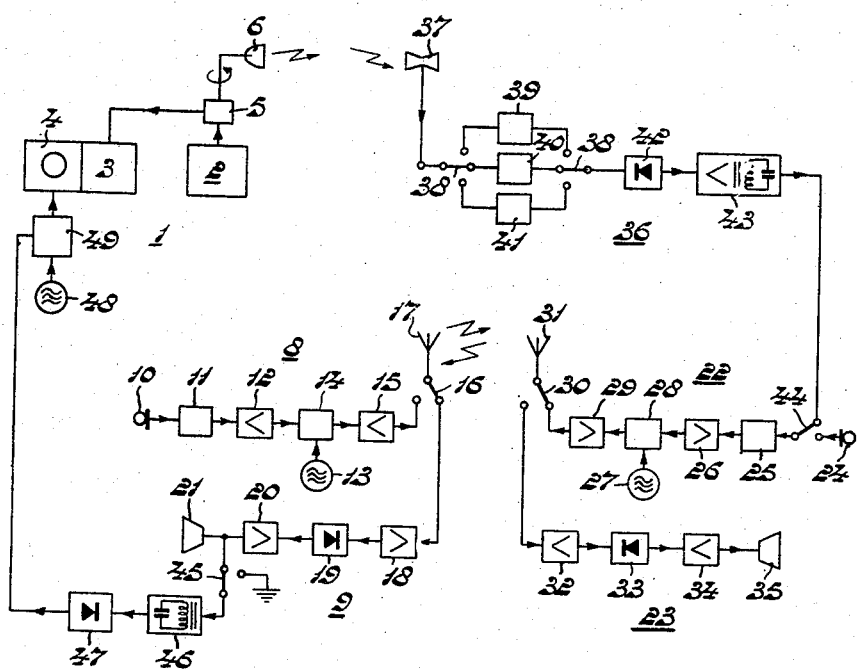
INVENTORS
ERICH GOLDBOHM
GERHARD PRINS
BY
AGENT United States Patent Office 2,831,185
Patented Apr. 15, 1958

2,831,185

SYSTEM FOR IDENTIFYING AND PILOTING MOBILE OBJECTS FROM A CONTROL OFFICE BY MEANS OF RADAR

Erich Goldbohm and Gerhard Prins, Noordwijk, Netherlands, assignors, by mesne assignments, to North American Philips Company, Inc., New York, N. Y., a corporation of Delaware Application June 11, 1953, Serial No. 360,890

Claims priority, application Netherlands June 25, 1952

7 Claims. (Cl. 343—6)

This invention relates to systems for piloting mobile objects, for example vessels or aircraft, from a control office which is equipped with radar apparatus comprising a radar display indicator for obtaining information about the position of craft to be piloted.

In the majority of cases, difficulties are experienced in interpreting the radar display in the control office. Thus, for example, in a harbour radar system it is difficult to determine, particularly if the harbour zone comprises busy waterways, which of the many spots of the panorama image of the harbour zone represents the vessel to be piloted. Hence, identification of the craft to be piloted is required. Once said difficulties are overcome and a given craft is supplied with navigation instructions by the observer of the radar display, it may happen that after the observer's attention has been diverted or the vessel to be piloted has passed in close proximity to another vessel, the craft may again need identification.

Analogous difficulties are experienced in conection with aerodrome-radar and air-defense radar systems which also require simple means for distinguishing friendly air-craft from enemy air-craft.

The present invention has for its object to provide a system referred to in the preamble, in which the control office and the mobile object to be piloted are equipped with transceivers tuned to a communication frequency, which is a particularly suitable and, by utilizing the available apparatus to full advantage, a very simple identification means.

In accordance with the invention for identification of the craft to be piloted, its transceiver comprises a change-over to transmission switch interrupting the low-frequency circuit of the transmitter and connecting it to the output of an auxiliary receiver comprising in succession a non-directional aerial, a filter tuned to the radar transmission frequency, a detector and an amplifier which is tuned to the recurrence frequency of control-office radar pulses from the detector and whose output circuit is adapted to be connected to the said low-frequency circuit of the transmitter by means of the identification change-over to transmission switch, the transceiver of the control office comprising an identification change-over to reception switch which is connected to the low-frequency portion of the communication receiver and enables said receiver to be connected, for identification, to brightness control means of the radar-display indicator to permit intensity modulation of the radar-display scanning lines during the reception of identification signals.

The system according to the invention is suitable for use in zones where many radar aparatus are operative, for example in harbour zones covered by a plurality of harbour- and ship-radar installations. There is a risk of identification signals being transmitted, via the transceiver installed on the craft to be piloted, due to radar impulses picked up by the auxiliary receiver and originating from radar transmitters other than the control office concerned.

In a harbour radar system comprising a plurality of control offices, neighbouring radar transmitters operate, with approximately equal pulse-recurrence frequencies, at different transmitting frequencies, for example in the 3 cm. band, in order to avoid interaction. The transmission of an identification signal upon reception of radar impulses from an unwanted control-office radar transmitter is counteracted by using a filter, tuned to the desired radar transmitter frequency, in the auxiliary receiver between the detector and the aerial which is non-directional for operational reasons.

However, said high-frequency selection may be inadequate to prevent the reception of radar impulses from nearby ship radar installations by means of the auxiliary receiver. To prevent the auxiliary receiver from responding to impulses of ship radar installations and other disturbing signals, the auxiliary receiver comprises after the detector an amplifier tuned to the recurrence frequency of the control-office radar impulses, while utilizing the fact that the impulse recurrence frequency of the control-office radar impulses is normally much higher than is usual in ship radar installations; for example, the recurrence frequency of the control-office radar impulses is approximately 3000 c./s. The use of the amplifier thus tuned has the additional advantage that the signal therefrom falls within the speech frequency band and a speech frequency band-pass filter forming part of the transceiver may be utilised for further filtering of the identification signal.

For further discrimination with respect to disturbing signals it is advantageous to use a thresholding device in the auxiliary receiver cascade between the filter tuned to the radar transmitter frequency and the low-frequency filter, said thresholding device passing only signals exceeding a minimum amplitude. As a matter off act, radar impulses from the control-office supplying navigation directions will, in general, have a comparatively large amplitude which, after high-frequency selection, will at least be larger than that from another control office intended for supplying navigation directions in another sector of the navigation zone.

In a typical operation of the invention, a pilot man will board a craft which is to be piloted, and will have with him the transceiver which is to be used for identification of the craft. When the radar control office asks for identification of the craft, the pilot will operate the identification change-over of his transceiver, thus interrupting the normal communication speech signal input of the transmitter and connecting the low-frequency input of this transmitter to the output of the associated auxiliary receiver. The identification signal from the auxiliary receiver, which signal is a substantially sinusoidal oscillation of, say, 3000 c./s., is subsequently transmitted via the normal speech communication channel and consequently appears with an appreciable amplitude in the output circuit of the control-office communication receiver. This output signal, preferably after having been refiltered with the aid of a circuit tuned to the recurrence frequency of the radar transmitter impulses, may be utilised directly for intensity control of the radar image indicator in order to cause increased lighting up of scanning lines in the region of the spot representing the craft to be piloted. The lighting up of said scanning lines may then occur unevenly throughout their length and therefore the incoming identification signals are preferably rectified, the impulses thus obtained being used for releasing a normally locked electronic switch, for example a negatively biassed grid-controlled electron-discharge tube. Through this switch a high-frequency auxiliary oscillator signal for brightness control is supplied to an intensity control electrode of the indicator tube. The scanning lines intersecting the spot representing the craft to be piloted then light up evenly throughout their length.

In order that the invention may be readily carried into effect, a preferred form of the system according to the invention and used for impulse radar, is shown in block diagram in the accompanying drawing, in which the control office apparatus is shown to the left and the apparatus, for example brought with a pilot aboard a craft to be piloted, is shown to the right.

The control office apparatus comprises an impulse radar apparatus 1 including a radar transmitter 2 and a radar receiver 3 comprising a P. P. I.-indicator 4. The radar transmitter and -receiver are coupled via a TR-switch 5 to a directional aerial 6 rotating about a vertical axis, for example at approximately 20 revolutions per minute.

The control office apparatus further comprises a transceiver 8, 9 designed for communication at a frequency of, say, 160 mcs./s. for exchanging intelligence with the pilot or navigator aboard the craft to be piloted. The transmitter 8 of this transceiver comprises, as usual, a microphone 10, a speech frequency band-pass filter 11 having a pass band of, say, 200 to 3400 c./s., a low-frequency amplifier 12, a modulator 14 connected to a transmitter oscillator 13 and a high-frequency amplifier 15 adapted to be connected to an aerial 17 via a transceiving switch 16.

The communication receiver 9, which is also adapted to be coupled to the aerial 17 via the transceiving switch 16 comprises in succession a high-frequency amplifier 18, a detector 19, a low-frequency amplifier 20 and a loudspeaker 21.

The radio apparatus used by the pilot comprises an analogous transceiver 22, 23, whose transmitter 22 comprises in succession a microphone 24, a speech frequency band-pass filter 25, a low-frequency amplifier 26, a modulator 28 connected to a transmitter oscillator 27, and a high-frequency amplifier 29 adapted to be connected to an aerial 31 via a transceiving switch 30. The associated receiver 23 comprises a high-frequency amplifier 32, a detector 33, a low-frequency amplifier 34 and a loudspeaker 35.

For identification of the craft to be piloted the radio apparatus for the pilot or navigator comprises an auxiliary receiver 36 deriving identification signals from radar impulses transmitted by the impulse radar apparatus 1. The auxiliary receiver 36 is equipped with an aerial, for example a horn aerial 37 or a slotted wave-guide aerial, suitable for non-directional reception (in the horizontal plane) of centimetric waves and adapted to be connected to a crystal detector 42 through wave guide filters 39, 40, 41 (having a band width of, say, a few mcs./s. which are tuned to different radar transmission frequencies and adapted to be switched in at will via selector switches 38. The crystal detector output is coupled, if desired through an intermediate frequency amplifier, to a low-frequency amplifier 43 by which the recurrence frequency of, say, 3000 c./s. of the control office radar impulses is selectively amplified. The crystal detector 42 or the input stage of the low-frequency amplifier 43 (as the case may be a stage of the intermediate frequency amplifier used) is preferably biassed in such manner that only signals exceeding a given minimum value are transmitted, thus forming a thresholding device in the receiver cascade.

During operation of the radar transmitter 2 of the control office, radar impulses are picked up by the auxiliary receiver 36 if the aerial beam points to the craft to be piloted, which is the case only during a fraction of the period of revolution of the aerial 6. For example, for approximately 8 to 12 millisec., during which time 25 to 35 radar impulses are received, with 20 revolutions per minute of the aerial 6, a pulse recurrence frequency of 3000 c./s. and a width of the beam of approximately 1° to 1.5°. In this event a substantially sinusoidal identification signal appears 20 times per minute in the output circuit of the low-frequency amplifier 43 of the auxiliary receiver 36, which amplifier is selective with respect to the pulse recurrence frequency. The use of the high- and low- frequency selection means and, if required, a thresholding device in the auxiliary receiver 36 yields, as stated above, a very effective discrimination of the desired radar signals with respect to disturbing radar signals.

The 3000 c./s. pulse voltage set up in the output of the auxiliary receiver is utilised as an identification signal. Between the microphone 24 and the speech frequency band-pass filter of the pilot transmitter 22 is provided an identification change-over to transmission switch 44 which at the request of the control office for identification is moved into the position shown in the drawing, thus interrupting the microphone connection and coupling the transmitter input to the output of the auxiliary receiver 36. The 3000 c./s. pulse voltage is subsequently transmitted through the normal transmitter cascade, inclusively of the speech frequency band-pass filter 25, to the control office receiver 9 and appears with an appreciable amplitude in the output circuit of the low-frequency amplifier 20 of this receiver. Connected to the last-mentioned output circuit is an identification change-over to reception switch 45 which is closed as shown in the drawing at the request for identification. The incoming identification signals are subsequently supplied, through the change-over switch 45 and a filter 46 for further filtering the identification signal, to a rectifier 47 for obtaining direct voltage impulses which, in accordance with the above numerical example, will have a duration of 8 to 12 millisec. Said direct voltage pulses, whose amplitude may vary for various reasons, are passed to brightness control means which are coupled to the P. P. I-indicator and comprise an auxiliary oscillator 48 which is tuned to, say, 1 to 3 mcs./s. and whose output circuit is coupled to an intensity control electrode of the P. P. I.-indicator tube through a normally locked electronic switch 49. The pulses from the rectifier 47 are supplied for unlocking to the electronic switch 49 to cause the indicator scanning lines to light up in a flashing manner throughout their length during each identification impulse. Said flashing scanning lines are those scanning lines intersecting the spot representing the craft to be piloted.

The auxiliary receiver described may alternately be used if the control office is equipped with frequency-modulation radar, but in this case a greater band-width (for example 20 mcs./s.) of the high-frequency amplifier of the auxiliary receiver must in general be used.

The disclosed system permits individual identification of vessels which are positioned so that their relative azimuth bearings, with respect to the radar control office, have a wider angle than the angular width of the transmitted radar signal. However, two or more vessels which have approximately the same azimuth direction relative to the control office, cannot be individually identified. Such a situation usually is not serious, because the vessels are moving and will soon be in relative positions to permit individual identification. Also, other expedients, such as cross-bearings, may be used in order to identify these vessels.

In the example described, transceivers designed for simplex communication are employed. Naturally, arbitrary other communication apparatus, for example for duplex communication, may be used for transmission of the low-frequency identification signals obtained by means of the auxiliary receiver.

What is claimed is:

1. A system for piloting mobile craft, comprising a control office having radar apparatus for transmitting pulse signals and having radar display apparatus which is intensity-modulated in accordance with reflections of said pulse signals, transceivers located respectively at said control office and at a mobile craft which is to be piloted, said transceivers being tuned to a communication frequency for mutual communication, and an auxiliary receiver located at said mobile craft which is to be piloted, the transceiver at said mobile craft comprising a changeover to transmission switch interrupting when actuated the low-frequency input circuit of the transmitter and connecting it to the output of said auxiliary receiver, said auxiliary receiver comprising in succession a non-directional aerial, a filter tuned to the radar transmission frequency, a detector and an amplifier which is tuned to the recurrence frequency of control-office radar pulses received from the detector to derive a substantially sinusoidal voltage from said pulses and whose output circuit is adapted to be connected to said low-frequency circuit of the transmitter by means of the identification change-over to transmission switch, the transceiver of the control office comprising an identification change-over to reception switch which is connected to the output of the low-frequency portion of the communication receiver and enables said receiver to be connected, for identification of the mobile craft, to brightness control means of the radar-display indicator to permit intensity modulation of the radar-display scanning lines, in addition to said first-named intensity modulation during the reception of identification signals from said transmitter which occur when said non-directional aerial picks up signals from said radar apparatus.

2. Radio apparatus for a control office in a system for piloting mobile craft, comprising a pulse-transmitting radar apparatus with a radar display indicator for obtaining information about the position of the craft to be piloted, and a transceiver for communication with a craft to be piloted, characterized in that said transceiver comprises an identification change-over to reception switch connected to the output of the low-frequency receiver portion for coupling the receiver, for the purpose of identification, to brightness control means of said radar display indicator in order to effect intensity modulation of the radar display scanning lines during the reception by said receiver of identification signals.

3. Radio apparatus as claimed in claim 2, characterized in that the brightness control means comprise a high-frequency auxiliary oscillator, a normally locked electronic switch connecting the output of said oscillator to an intensity control electrode of the radar display indicator, a rectifier, and means connected to supply, the incoming identification signals through said rectifier to the electronic switch for releasing the latter.

4. Radio apparatus for piloting a craft by means of radar, comprising a transceiver in said craft for communication with a control office and an auxiliary receiver in said craft for receiving radar impulses, characterized in that for transmitting identification signals the transceiver comprises an identification change-over to transmission switch adapted for interrupting the low-frequency input circuit of the transmitter and connecting it to the output of said auxiliary receiver, said auxiliary receiver comprising in succession a non-directional aerial, a filter tuned to the radar-transmission frequency, a detector and an amplifier which is tuned to the recurrence frequency of the control office radar impulses to derive a substantially sinusoidal voltage from said impulses and whose output circuit is adapted to be connected via the identification change-over to transmission switch to the said low-frequency input circuit of the transmitter.

5. Radio apparatus as claimed in claim 4, characterized in that the auxiliary receiver comprises a thresholding device comprising an amplifying tube biassed to pass only signals exceeding a minimum value of amplitude.

6. A radio system as claimed in claim 4, characterized in that the low-frequency circuit of the transmitter comprises a speech frequency band-pass filter, the band-pass range of which includes the frequency of said sinusoidal voltage.

7. Radio apparatus as claimed in claim 2, including a filter connected in series with said change-over to reception switch and tuned to the recurrence frequency of said pulses.

References Cited in the file of this patent
UNITED STATES PATENTS

| | | |
|---|---|---|
| 2,513,490 | Jones | July 4, 1950 |
| 2,528,202 | Wolff | Oct. 31, 1950 |
| 2,547,945 | Jenks | Apr. 10, 1951 |